United States Patent
Liogier D'Ardhuy et al.

(10) Patent No.: US 7,780,874 B2
(45) Date of Patent: Aug. 24, 2010

(54) MULTI-PHASE LIQUID COMPOSITION AND OPTICAL ELECTROWETTING DEVICE THAT INCORPORATES THE SAME

(75) Inventors: Gaëtan Liogier D'Ardhuy, Lyons (FR); Franck Amiot, Annemase (FR); Geraldine Malet, Villeurbanne (FR)

(73) Assignee: Varioptic, Lyons (FR)

( * ) Notice: Subject to any disclaimer, the term of this patent is extended or adjusted under 35 U.S.C. 154(b) by 755 days.

(21) Appl. No.: 11/700,089

(22) Filed: Jan. 31, 2007

(65) Prior Publication Data

US 2007/0179200 A1 Aug. 2, 2007

Related U.S. Application Data

(60) Provisional application No. 60/763,889, filed on Feb. 1, 2006.

(30) Foreign Application Priority Data

Feb. 1, 2006 (EP) .................................. 06356010

(51) Int. Cl.
*H01B 1/00* (2006.01)
(52) U.S. Cl. .................. 252/500; 252/299.63; 349/1; 359/665; 359/666
(58) Field of Classification Search ............. 252/299.63, 252/500; 349/1; 359/665, 666
See application file for complete search history.

(56) References Cited

U.S. PATENT DOCUMENTS 6,174,458 B1 * 1/2001 Koga et al. ............. 252/299.63

2006/0151754 A1 * 7/2006 Choi et al. .................. 252/500
2007/0058094 A1 * 3/2007 Kuiper et al. .................. 349/1

FOREIGN PATENT DOCUMENTS

| JP | 2004-205993 | * | 7/2004 |
| WO | WO 00/50478 A1 | * | 8/2000 |
| WO | 2004/099830 A1 | | 11/2004 |
| WO | 2004/099844 A1 | | 11/2004 |
| WO | 2004/099845 A1 | | 11/2004 |

OTHER PUBLICATIONS

Kuiper, S. and Hendriks, B.H.W.: "Variable-focus Liquid Lens for Miniature Cameras," Applied Physics Letters, vol. 85, No. 7, Aug. 16, 2004, 3 pages.
Berge, B. and Peseux, J.: "Variable Focus Lens Controlled by an External Voltage: An Application of Electrowetting," European Physical Journal E, vol. 3, Issue 2, Oct. 2000, 5 pages.
European Search Report for EP06356010 mailed Nov. 22, 2006, 9 pages.

* cited by examiner

*Primary Examiner*—Mark Kopec
*Assistant Examiner*—Khanh Tuan Nguyen
(74) *Attorney, Agent, or Firm*—Osha • Liang LLP

(57) ABSTRACT

The present invention relates to a multi-phase liquid composition comprising a conductive fluid and a non-conductive fluid, the non-conductive fluid being immiscible in the conductive fluid, the composition having a mean arithmetic cinematic viscosity of between about 1.5 cSt and about 40 cSt, within a temperature range of about −20° C. to about +70° C. The invention also pertains to an optical electrowetting device comprising said multi-phase liquid composition, as well as an optical lens driven by electrowetting, and apparatus comprising the same.

14 Claims, 1 Drawing Sheet

MULTI-PHASE LIQUID COMPOSITION AND OPTICAL ELECTROWETTING DEVICE THAT INCORPORATES THE SAME

The invention relates to a multi-phase liquid composition. The invention also relates to an optical electrowetting device, particularly to an optical lens lens driven by electrowetting, comprising a multi-phase liquid composition of the invention.

Optical electrowetting devices are devices capable of modifying an incident beam to achieve a specific optical function. They include variable focus liquid lenses, optical diaphragms, optical zooms, ophthalmic devices and are increasingly proposed in a number of applications and apparatuses, such as for example cameras, cell phones, telemeters, endoscopes, dental videos and the like.

An optical lens driven by electrowetting and of variable focal length is described for example in European Patent EP-B1-1,166,157, the content of which is incorporated herein by reference. FIG. 1 of the present application corresponds to FIG. 12 of that patent. A cell is defined by a fluid chamber comprising a lower plate 7, 9 and an upper plate 1, and a perpendicular (normal to), or substantially perpendicular (normal to), axis Δ. The lower plate, which is non-planar, comprises a conical or cylindrical depression or recess 3, which contains a non-conductive or insulating fluid 4. The remainder of the cell is filled with an electrically displaceable conductive fluid 5 along the axis $\tilde{\Delta}$ The fluids are non-miscible, in contact over a meniscus (A, B), and have a different refractive index and substantially the same density. The cell comprises an electrical insulating substrate 2, arranged on at least an area of the lower plate, on which both fluids are in contact.

The thickness of the insulating substrate is preferably comprised between about 0.1 μm and about 100 μm. Generally, small thickness is to be used for optical electrowetting devices working at low voltage, whereas thick insulating substrate is used for high voltage applications.

On FIG. 1, the insulating substrate covers the entire lower plate, but it may be limited to an area of the lower plate on which both fluids are in contact. A first electrode is separated from the conductive fluid and the insulating fluid by the insulating substrate. In this example, the lower plate comprises a conductive body 7 acting as the first electrode and a transparent window 9 for the passage of the beam of light. The conductive body in FIG. 1 is used for the centering of the non conductive fluid. Another electrode 8 is in contact with the conductive fluid. The wettability of the insulating substrate by the conductive fluid varies under the application of a voltage V between the first and the second electrodes, such that through electrowetting phenomena it is possible to modify the shape of the meniscus, depending on the voltage V applied between the electrodes. Thus, a beam of light passing through the cell normal to the plates in the region of the drop will be focused to a greater or lesser extent according to the voltage applied. Voltage V may be increased from 0 volt to a maximum voltage, which depends on the used materials. For example, when the voltage increases, the non-conducting fluid drop 4 deforms to reach a limiting position (designated as B). While drop 4 deforms from its position A (rest position, without tension, concave interface with conductive fluid 5) to its position B (convex interface with conductive fluid 5), the focus of the liquid lens varies.

The conductive fluid generally is a salt containing-aqueous fluid. The insulating fluid is typically an oil, an alkane or a mixture of alkanes, possibly halogenated.

The optical quality of an optical electrowetting device may vary in the conditions of use, depending on various parameters.

Importantly, the optical liquid lenses driven by electrowetting may present a focal hysteresis, meaning that their optical powers differ depending on voltage ramp direction, increasing or decreasing. In other words, the focal length of the device at a given voltage value may be different depending on whether the tension is increasing or decreasing and the interface between the conductive and the non-conductive fluids is moving towards or inwards with respect to the axis of the cell. It has been found that this phenomenon is related to contact angle hysteresis. It has finally been found that a degradation of the optical quality is associated with such a hysteresis.

It has now been found that the conductive fluid and the non-conductive fluid must have some specific common properties in order to provide a very performing optical electrowetting device, typically an optical lens, to be used as a variable focus liquid lens, optical diaphragm, optical zoom and any other optical device using electrowetting in an inside or outside environment.

One objective of the invention is to provide a multi-phase liquid composition and an optical electrowetting device having improved optical properties.

Another objective is to provide such a multi-phase liquid composition and such a device that keeps at least substantially unchanged its optical properties such as transparency on a wide range of temperature.

Another objective is to provide such composition and device that keep at least substantially unchanged its time response to electrical impulsion in either voltage ramp directions, increasing or decreasing, on a wide range of temperature.

Still another objective is to provide such a device that can be used as an optical lens driven by electrowetting, a variable focus liquid lens, optical diaphragm, optical zoom and any other optical device using electrowetting in an inside or outside environment.

The inventors have now discovered that these and other objectives are met in whole or in part with the multi-phase composition of the present invention.

In one aspect, the invention relates to a multi-phase liquid composition comprising a conductive fluid and a non-conductive fluid, the non-conductive fluid being immiscible in the conductive fluid, the composition having a mean arithmetic cinematic viscosity of between about 1.5 cSt and about 40 cSt, preferably of between about 1.5 cSt and about 20 cSt, more preferably of between about 3 cSt and about 10 cSt, within a temperature range of about −10° C. to about +60° C., preferably of about −20° C. to about +60° C. preferably of about −20° C. to about +70° C.

The inventors have observed that the mean arithmetic cinematic viscosity is the important parameter that must be taken into account when trying to obtain an optical electrowetting device with fast response time. This parameter has been shown to be more relevant than the separate values of each of the fluids that will be used to form the liquid-liquid interface of the optical electrowetting device. In other words, good performances of the optical electrowetting device can be achieved with one value of the viscosity for one of the fluid being outside the specified range if the mean arithmetic cinematic viscosity is in the said range.

In the present application, description and claims, the words "comprise/comprising" are synonymous with (means the same thing as) "include/including," "contain/containing", are inclusive or open-ended and do not exclude additional, unrecited elements. The term "immiscible" refers to fluids that are non miscible or substantially non miscible the one into the other.

In the present application, description and claims, the cinematic viscosity is measured following ASTM D7042-04. The resistance of the liquid between a rotor and a stator is determined at the determined temperature, e.g. at about −20° C., −10° C., +60° C. or +70° C. and/or at intermediate values within the range of temperature comprised between about −20° C., −10° C., and +60° C. or +70° C. A viscometer of the type of Anton Paar SVM 3000 may be used, and reference is made to EP-B1-0 926 481, the content of which is hereby incorporated. The content of these documents is hereby incorporated herein by reference. The mean arithmetic cinematic viscosity is the mathematic mean of the cinematic viscosities measured separately for the conductive and non-conductive fluids using the above method.

According to another feature, the difference of viscosity between the conductive fluid and the non-conductive fluid is comprised between 0 cSt and about ±10 cSt, preferentially between 0 cSt and about ±5 cSt, within a temperature range of about −10° C. to about +60° C., preferably of about −20° C. to about +60° C., more preferably about −20° C. to about +70° C.

According to another feature, the electrical conductive fluid comprises water and at least one organic or inorganic ion, typically at least one organic or inorganic ionic or ionizable salt, or a mixture thereof, conferring conductive properties to said fluid.

In the following specification, "ionic salts" refers to salts that are totally or substantially totally dissociated (such as a bromine-anion and a cation) in water. "Ionizable salts" refers to salts that are totally or substantially totally dissociated in water, after chemical, physical or physico-chemical treatment.

Ions that are suitable in the present invention include both cations and anions, which may be simultaneously, but not necessarily, present together in the conductive fluid.

Examples of anions include, but are not limited to, halides, e.g. chloride, bromide, iodide, sulfate, carbonate, hydrogen carbonate, acetate, and the like, as well as mixtures thereof. Examples of cations include, but are not limited to, alkali, alkaline-earth and metallic cations.

Organic and inorganic ionic and ionizable salts are thus well known in the art, and examples of these include, but are not limited to potassium acetate, magnesium chloride, zinc bromide, lithium bromide, sodium bromide, lithium chloride, calcium chloride, sodium sulfate, and the like, as well as mixtures thereof.

Mixtures of one or more ionic salts together with one or more ionizable salts are also encompassed by the present invention.

According to a particularly preferred embodiment of the present invention, the salt present in the conductive fluid is sodium sulfate, potassium acetate, zinc bromide, sodium bromide, or lithium bromide, and mixtures thereof, and more preferably, sodium sulfate, potassium acetate, sodium bromide, or lithium bromide, and mixtures thereof.

As already mentioned, the conductive fluid comprises an organic or inorganic ionic or ionizable salt. Said salt is dissolved in water.

Water to be used in the conductive fluid should be as pure as possible, i.e. free, or substantially free, of any other dissolved components that could alter the optical properties of the optical electrowetting device, namely an optical lens driven by electrowetting. Ultra pure water is most preferably used.

The concentration of the dissolved salt in the conductive fluid may vary in large proportions, keeping in mind a too high concentration may result in undesirable increase of density, refractive index, turbidity, haze, or loss of transparency for the optical lens.

According to another feature, the electrical conductive fluid comprises at least one conventional freezing-point lowering agent. As freezing-point lowering agent, mention may be made of alcohol, glycol, glycol ether, polyol, polyetherpolyol and the like, or mixtures thereof. Examples thereof include the following agents: ethanol, ethylene glycol (EG), monopropylene glycol (MPG or 1,2-propane-diol), 1,3-propane diol, 1,2,3-propane triol (glycerol), and the like, and mixtures thereof. In an embodiment, the conductive fluid comprises a mixture of water, MPG and glycerol. According to a feature, this agent aims at decreasing the freezing point of the conductive fluid which should stay liquid over a range of temperature comprised between about −20° C. and about +70° C.

According to another feature, salts, for example such as halides, acetates or sulfates, have been found to lower the freezing point of the conductive fluid. As such, and according to another feature, the freezing-point lowering agent may be the salt itself, so that any additional freezing-point lowering-agent is not necessary, but still possible if desired.

According to still another feature, the conductive fluid comprises at least one viscosity-controlling agent, namely a viscosity-adjusting agent. The viscosity-adjusting agent that may be used in the invention may be of any type known from the one skilled in the art and may be advantageously an alcohol, a glycol, a glycol ether, a polyol, a poly ether polyol and the like, or mixtures thereof. Examples thereof include the following agents: ethanol, ethylene glycol (EG), monopropylene glycol (MPG), 1,3-propane diol, 1,2,3-propane triol (glycerol), and the like, and mixtures thereof. In a preferred embodiment, the viscosity-adjusting agent has a molecular weight of less than about 130 g/mol.

The viscosity-adjusting agent may be the same or different from the freezing-point lowering agent. According to a feature, the conductive fluid comprises an agent that is both a freezing-point lowering agent and a viscosity-adjusting agent.

According to still another feature, the conductive fluid advantageously comprises a biocide agent in order to prevent the development of organic elements, such as bacteria, fungi, algae, micro-algae, and the like, which could worsen the optical properties of the optical electrowetting device, particularly in the case of a lens driven by electrowetting.

Such biocide agent may be of any type known in the art, provided, as is the case for the freezing-point lowering agent and the viscosity-adjusting agent, that it does not alter the required optical properties of the conductive fluid (transparency, refractive index, and the like, as mentioned above).

As stated above, the conductive fluid comprising a ionic or ionizable organic or inorganic salt is present together with an immiscible non conductive fluid so as to form a multi-phase liquid composition for use in an optical electrowetting device, e.g. an optical lens driven by electrowetting.

According to another feature, the multi-phase liquid composition comprises a non-conductive fluid that is immiscible in the conductive fluid. This non-conductive fluid comprises an organic or an inorganic (mineral) compound or mixture thereof. Examples of such organic or inorganic compounds include a Si-based monomer or oligomer, a Ge-based monomer or oligomer, a Si—Ge-based monomer or oligomer, a hydrocarbon, or a mixture thereof.

The hydrocarbon may be linear or branched and may contain one or more saturated, unsaturated or partially unsaturated cyclic moiety(ies). The hydrocarbon has advantageously from about 10 to about 35 carbon atoms, preferably from about 20 to about 35 carbon atoms. Hydrocarbons having less than about 10 carbon atoms are less preferred since miscibility into the conductive fluid may occur.

The hydrocarbon may comprise one or more unsaturation(s) in the form of double and/or triple bond(s). More than 2 or 3 double or triple bonds are not preferred considering the risk of decomposition with UV radiations. Preferably the hydrocarbon does not contain any double or triple bonds, in which case the hydrocarbons are referred to as alkanes in the present specification.

The hydrocarbon may further comprise one or more heteroatoms, as substituents and/or as atoms or groups of atoms interrupting the hydrocarbon chain and/or ring. Such heteroatoms include, but are not limited to oxygen, sulfur, nitrogen, phosphor, halogens (mainly as fluorine, chlorine, bromine and/or iodine). Care should be taken that the presence of one or more heteroatom(s) does not impact the immiscibility of the two fluids.

May be used mixtures containing more than about 99.8% of alkanes. These mixtures may contain little amount of aromatic groups and/or unsaturated moieties in a ratio lower than about 1 weight % (preferentially lower than about 0.5%). Chlorine may also be present in said alkane, in a ratio lower than about 10 weight %, preferentially lower than about 7%. Such impurities may be present as sub-product resulting from the preparation of the alkanes, e.g. when they are obtained by distillation process.

According to various features of the present invention, the hydrocarbon is or comprises:

- a linear or branched alkane, such as decane ($C_{10}H_{22}$), dodecane ($C_{12}H_{24}$), squalane ($C_{30}H_{62}$), and the like;
- an alkane comprising one or more rings, such as tert-butylcyclohexane ($C_{10}H_{20}$), and the like;
- a fused ring system, such as α-chloronaphthalene, α-bromonaphthalene, cis,trans-decahydronaphthalene ($C_{10}H_{18}$), and the like;
- a mixture of hydrocarbons, such as those available as Isopar® V, Isopar® P (from Exxon Mobil); and the like, and mixtures thereof.

In the present application, an oligomer is a compound having a number of identical (homo-oligomers) or different (co-oligomers) repeating units, of between about 2 and about 20, preferably between about 2 and about 10, and still more preferably between about 2 and about 5.

Oligomers having more than about 20 repeating units are less preferred since they may induce an undesirable increase of viscosity at low temperature.

The non-conductive fluid may contain one or several of the following silicon-based compound:

a siloxane of the formula 1a, 1b or 1c:

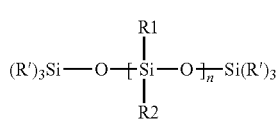

-continued

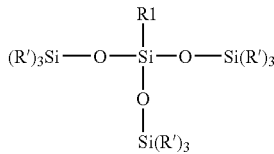

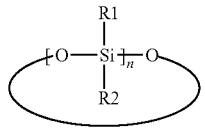

wherein each of R1, R2 and R' independently represents alkyl, (hetero)aryl, (hetero)arylalkyl, (hetero)arylalkenyl or (hetero)arylalkynyl and n is comprised between about 1 and about 20, preferably between about 1 and about 10, more preferably n is 1, 2, 3, 4 or 5 and with the precision that n is greater than 2 in formula 1c;

a silane of formula 2:

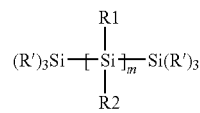

wherein R1, R2 and R' are as defined above and m is comprised between about 1 and about 20, preferably between about 1 and about 10, more preferably m is 1, 2 or 3;

a monosilane of formula 3:

wherein R1 and R2 are as defined above, and each of R3 and R4 independently represents alkyl, (hetero)aryl, (hetero)arylalkyl, (hetero)arylalkenyl or (hetero)arylalkynyl.

In the above formulae:

- alkyl means a straight or branched alkyl radical having from about 1 to about 10 carbon atoms, preferably from about 1 to about 6 carbon atoms; preferred alkyl includes methyl, ethyl, n-propyl, iso-propyl; alkyl radical may be halogenated, for instance may comprise a 1,1,1-trifluoropropyl group;
- (hetero)aryl means an aromatic or heteroaromatic radical containing from about 5 to about 12 atoms, forming at least one, preferably one, aromatic and/or heteroaromatic ring, said ring(s) being optionally substituted by one or more halogens, preferably 1, 2, 3 halogen atoms (mainly fluorine, chlorine and/or bromine), and being optionally fused with one or more saturated, partially saturated or unsaturated ring system; preferred (hetero) aryls include phenyl, naphthyl, bicyclo[4.2.0]octatrienyl, optionally substituted with 1, 2 or 3 halogen atoms;
- (hetero)arylalkyl is as defined above for each of the alkyl and (hetero)aryl radical; preferred (hetero)arylalkyls include benzyl, phenethyl, optionally substituted with 1, 2 or 3 halogen atoms;
- (hetero)arylalkenyl and (hetero)arylalkynyl correspond to radicals wherein the (hetero)aryl moiety is as defined above, and alkenyl and alkynyl represent a straight or branched alkyl radical, as defined above, further comprising one or more, preferably one, double bond or one or more, preferably one, triple bond, respectively.

According to a preferred embodiment, in the above formulae 1a, 1b and 2, all R' are identical or different and are preferably methyl or halogenated alkyls;

According to a further preferred embodiment, in the above formulae 1a, 1b and 2, all R' are the same, more preferably each R' is methyl.

The non-conductive fluid may contain one or several of the following specific silicon-based species:
hexamethyldisilane, diphenyldimethylsilane, chlorophenyltrimethylsilane, phenyltrimethyl-silane, phenethyltris(trimethylsiloxy)silane, phenyltris(trimethylsiloxy)silane, polydimethylsiloxane, tetra-phenyltetramethyltrisiloxane, poly(3,3,3-trifluoropropylmethyl-siloxane), 3,5,7-triphenylnonamethyl-pentasiloxane, 3,5-diphenyloctamethyltetrasiloxane, 1,1,5,5-tetraphenyl-1,3,3,5-tetramethyl-trisiloxane, and hexamethylcyclotrisiloxane.

The non-conductive fluid may contain one or several of the following germane based species:
germanoxane of formula 4
germane of formula 5
germane of formula 6

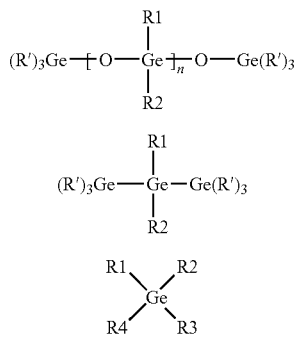

wherein R', R1, R2, R3, R4 and n are as defined above.

The non-conductive fluid may contain one or several of the following specific germane based species: hexamethyldigermane, diphenyldimethylgermane, phenyltrimethyl-germane.

According to another feature, the non-conductive fluid comprises at least one Si- and/or Ge-based compound substituted by one or more phenyl groups and/or other groups like fluorinated or non fluorinated alkyl(ethyl, n-propyl, n-butyl), linear or branched alkyls, chlorinated or brominated phenyl groups, benzyl groups, halogenated benzyl groups; or a mixture of Si- and/or Ge-based compounds wherein at least one compound is substituted by one or more phenyl groups and/or other groups like fluorinated or non fluorinated alkyl(ethyl, n-propyl, n-butyl), linear or branched alkyls, chlorinated or brominated phenyl groups, benzyl groups, halogenated benzyl groups.

Si-based compounds (including silanes, siloxanes) are particularly advantageous for their chemical stability. Good performances have been obtained using siloxane compounds, advantageously aryl siloxane compounds, which have shown to lead to higher refractive indices. In a preferred embodiment, the ratio of the total number of aryl, e.g. phenyl, radicals or groups carried by the Si-based compound(s) to the total number of Si atoms is equal to or less than about 1.33, preferably equal to or less than about 1, and more preferably equal to or less than about 0.8.

Using selected siloxanes wherein the number ratio of aryl, e.g. phenyl, radicals or groups to Si atoms is equal to or less than about 1.33, preferably, less than about 1, and more preferably less than about 0.8, has shown to lead to a decrease of turbidity to less than about 200 NTU, which is an acceptable value for use in optical electrowetting devices, such as optical lenses.

Turbidity, or haze, is generally not observed, or is below about 1 NTU, after thermal stress, when the non-conductive fluid is, or comprises, a hydrocarbon, typically an alkane.

According to another feature, Ge-based oils, and more preferably aryl- (e.g. phenyl-) mono-germane compounds, such as diphenyldimethylgermane and phenyltrimethylgermane, can be advantageously used as wetting agents. They exhibit adequate wetting properties for optical electrowetting devices. They are very stable under UV irradiation and toward the hydrolysis phenomena when stored in high temperature. Such aromatic germane based oils have high refractive index, which is the most suitable for the optical performances of the lens. They are rather dense and can be used to increase the density of the oil and equilibrate the densities between oil and conductive phase. Advantageously, for a given refractive index, germane based oils are less viscous than siloxanes.

According to another feature of the present invention, the non-conductive fluid comprises a wetting agent to increase the wettability of said fluid on the lower plate (isolating substrate) of the lens. The nature of the wetting agent will depend on the nature of the lower plate surface of said lens.

Still according to another feature, the organic or inorganic (mineral) compound or mixture thereof that is the primary component of the non-conductive fluid may itself have wetting properties with respect to the substrate or the coating, as is for example the case with aryl mono germane compounds as described above, or may comprise a component that presents this property. The organic or inorganic (mineral) compound may thus itself be the wetting agent when a specific substrate or coating is used.

Examples of organic or inorganic (mineral) compounds—and/or of wetting agents, specifically on Parylene® (a possible substrate that may be used in an optical electrowetting device with a multi-phase liquid composition of the present invention), or other non-conductive (isolating) layer or coating having a high surface energy (>30 mN/m)—are presented in Tables 1, 2 and 3 below:

TABLE 1

| Compound | Density at 20° C. (g/cm3) | Refractive index at 589.3 nm at 20° C. | viscosity at 20° C. (cSt) | Surface tension at 20° C. (mN/m) |
|---|---|---|---|---|
| 1-Bromononane | 1.0895 | 1.4545 | 1.9 | 28.69 |
| 1,2-Dibromohexane | 1.5812 | 1.5026 | 1.7 | 30.52 |
| Bromocyclohexane | 1.3347 | 1.4954 | 1.8 | 31.57 |
| 1-Chloro-2-methyl-2-phenylpropane | 1.0423 | 1.5244 | 3.2 | 34.36 |
| 1,9-Dichlorononane | 1.0102 | 1.4599 | 3.9 | 34.49 |
| 1,8-Dichlorooctane | 1.0261 | 1.4592 | 3.2 | 34.52 |

TABLE 1-continued

| Compound | Density at 20° C. (g/cm3) | Refractive index at 589.3 nm at 20° C. | viscosity at 20° C. (cSt) | Surface tension at 20° C. (mN/m) |
|---|---|---|---|---|
| 1,10-Dichlorodecane | 0.9966 | 1.4609 | 4.8 | 34.54 |
| Cycloheptylbromide | 1.3085 | 1.5045 | 2.4 | 35.05 |
| 1-Chloro-3-phenylpropane | 1.0478 | 1.5222 | 2.4 | 35.94 |
| 2-phenylethylbromide | 1.37 | 1.5573 | 2.3 | 37.69 |
| 1,8-Dibromooctane | 1.4657 | 1.4993 | 4.1 | 37.73 |
| 1-Bromo-3-phenylpropane | 1.3127 | 1.545 | 2.7 | 37.92 |
| 1,6-Dibromohexane | 1.608 | 1.5073 | 2.7 | 38.39 |
| 1,9-Dibromononane | 1.4115 | 1.4964 | 4.9 | 39 |
| 1,1,2-Tribromoethane | 2.61 | 1.593 | 1.63 | 43.16 |

TABLE 2

| Compound | density at 20° C. (g/cm3) | refractive index at 589.3 nm at 20° C. | viscosity at 20° C. (cSt) | Surface tension at 20° C. (mN/m) |
|---|---|---|---|---|
| Cyclohexylbenzene | 0.9424 | 1.5258 | 3.0 | 30.62 |
| 1,2-Dichlorobenzene | 1.3061 | 1.5514 | 1.1 | 31.56 |
| 1-Chloro-2-fluorobenzene | 1.2405 | 1.5010 | 0.8 | 31.82 |
| 2-Chloro-1,4-dimethylbenzene | 1.056 | 1.5235 | 1.0 | 31.9 |
| Chlorobenzene | 1.1066 | 1.5248 | 0.7 | 32.63 |
| 1-Bromo-4-propylbenzene | 1.286 | 1.5363 | 1.6 | 33.15 |
| 1-Bromo-4-ethylbenzene | 1.3395 | 1.5446 | 1.1 | 33.65 |
| Bromobenzene | 1.4964 | 1.5597 | 0.8 | 33.99 |
| 1-Phenyl-1-cyclohexene | 0.99 | 1.5684 |  | 37.25 |
| Cyclopropyl phenyl sulfide | 1.0619 | 1.5823 | 2.7 | 38.43 |
| 4-Chlorodiphenyl ether | 1.1916 | 1.5885 | 4.7 | 39.13 |
| Thioanisole | 1.0584 | 1.5870 | 1.5 | 39.23 |
| Phenyl sulfide | 1.1123 | 1.6328 | 4.3 | 41.36 |
| 4-Bromodiphenyl ether | 1.4213 | 1.6082 | 5.9 | 42.12 |
| 2-Fluorobenzophenone | 1.1853 | 1.5856 | 17.8 | 42.44 |
| 1-Bromonaphtalene | 1.4889 | 1.6582 | 3.7 | 43.57 |
| 2-Bromothioanisole | 1.542 | 1.6338 | 3.3 | 44.58 |

TABLE 3

| Compound | density at 20° C. (g/cm3) | refractive index at 589.3 nm at 20° C. |
|---|---|---|
| Diphenyldimethylgermane | 1.18 | 1.573 |
| Phenyltrimethylgermane | 1.11 | 1.505 |
| Diphenyldimethylsilane | 0.99 | 1.561 |

Examples of organic or inorganic (mineral) compounds—and/or of wetting agents specifically on Teflon® AF or other isolating layer or coating having a low surface energy (< about 30 mN/m)—are presented in the following Tables 4 (siloxanes) and 5 (other compounds):

TABLE 4

| Compound | Density at 20° C. (g/cm3) | Refractive index at 589.3 nm at 20° C. | Viscosity at 20° C. (cSt) | Surface tension at 20° C. (mN/m) |
|---|---|---|---|---|
| 3,5-Diphenyloctamethyl-tetrasiloxane | 0.9759 | 1.4772 | 6.7 | 23.92 |
| Baysilone M 5 (Bayer) | 0.9162 | 1.3982 | 5.4 | 18.41 |
| Baysilone PK 20 (Bayer) | 0.9822 | 1.4609 | 21.5 | 22.05 |
| Siloxane DC200/0.65 (Dow Corning) | 0.7634 | 1.3772 | 0.6 | 15.57 |
| Siloxane DC200/10 (Dow Corning) | 0.9392 | 1.4010 | 10.7 | 18.38 |
| Siloxane DC200/5 (Dow Corning) | 0.9168 | 1.3980 | 5.6 | 18.61 |
| Siloxane DC702 (Dow Corning) | 1.0916 | 1.5181 | 62.2 | 28.45 |
| Siloxane DC FS1265 (Dow Corning) | 1.2509 | 1.3814 | 410.3 | 21.56 |

TABLE 4-continued

| Compound | Density at 20° C. (g/cm3) | Refractive index at 589.3 nm at 20° C. | Viscosity at 20° C. (cSt) | Surface tension at 20° C. (mN/m) |
|---|---|---|---|---|
| DES T11 (ABCR) | 0.9468 | 1.4330 | 6.3 | 23.85 |
| DMS-T02 (ABCR) | 0.8978 | 1.3955 | 3.3 | 18.2 |
| Hexamethyldisilane | 0.71 | 1.4226 | | 20.56 |
| PMM-0011 (ABCR) | 0.979 | 1.4806 | 6.55 | 23.32 |
| poly(Dimethylsiloxane-co-diphenylsiloxane), 550 | 1.0643 | 1.4977 | 148.8 | 24.73 |
| poly(Dimethylsiloxane-co-diphenylsiloxane), dihydroxy terminated | 1.0477 | 1.4717 | 71.3 | 21.89 |
| Rhodorsil 47V10 (Rhodia) | 0.9376 | 1.4007 | 10.6 | 19.16 |
| Rhodorsil 550 (Rhodia) | 1.068 | 1.5008 | 192.5 | 21.32 |
| Rhodorsil 604V50 (Rhodia) | 0.9623 | 1.4039 | 53.5 | 20.13 |
| SIB 1816.0 (ABCR) | 1.4772 | 1.3383 | 9.7 | 18.73 |
| FMS 121 | 1.224 | 1.3810 | 125.6 | 21.73 |

TABLE 5

| Compound | Density at 20° C. (g/cm3) | Refractive index at 589.3 nm at 20° C. | Viscosity at 20° C. (cs) | Surface tension at 20° C. (mN/m) |
|---|---|---|---|---|
| 1,3,5-Triisopropylbenzene | 0.84 | 1.4886 | 4.9 | 26.87 |
| 1,3-Diisopropylbenzene | 0.8559 | 1.4887 | 1.7 | 27.28 |
| 1-bromo-2,5-difluorobenzene | 1.708 | 1.5087 | | 25.75 |
| 1-bromo-4-butylbenzene | 1.2399 | 1.5301 | 2.0 | 23.59 |
| 1-Bromododecane | 1.0355 | 1.4580 | 3.8 | 27.65 |
| 1-chlorooctane | 0.873 | 1.4303 | 1.4 | 26.74 |
| 1-Chlorotetradecane | 0.8652 | 1.4468 | 5.1 | 29.62 |
| 2-bromododecane | 1.02 | 1.4576 | | 25.28 |
| cis,trans-decahydronaphthalene | 0.881 | 1.4740 | 2.9 | 28.54 |
| Cyclohexane | 0.7786 | 1.4261 | 1.2 | 25 |
| Dodecane | 0.753 | 1.4218 | | 24.53 |
| Heptane | 0.684 | 1.3876 | 0.5 | 20.27 |
| Hexane | 0.6597 | 1.3748 | 0.3 | 18.05 |
| Isopar ® P | 0.8001 | 1.4442 | 4.2 | 25.24 |
| Nonane | 0.7178 | 1.4054 | 0.9 | 22.5 |
| Octane | 0.7029 | 1.3974 | 0.6 | 21.39 |
| o-Xylene | 0.88 | 1.5048 | 0.9 | 26.94 |
| p-Xylene | 0.8611 | 1.4958 | 0.7 | 27.6 |
| Undecane | 0.7406 | 1.4171 | 1.5 | 23.93 |
| 1,1,1,5,5,5-Hexafluoroacetylacetone | 1.47 | 1.3342 | | 14.74 |
| Bromopentafluorobenzene | 1.9442 | 1.4493 | 0.8 | 25.53 |
| Fluorinated HFE 7200 (3M) | 1.4338 | | 0.5 | 14.38 |
| FC-40 (3M) | 1.8839 | | 2.9 | 16.38 |
| FC-75 (3M) | 1.7735 | | 0.9 | 14.35 |
| Perfluoropolyether Galden HT230 (Solvaysolexis) | 1.8295 | | 5.8 | 15.49 |
| Perfluoropolyether Galden HT270 (Solvaysolexis) | 1.8612 | | 17.5 | 16.43 |
| 1-Fluorooctane | 0.8123 | 1.3953 | 1.0 | 23.77 |

Among the wetting agents, those of formula (I) or of formula (II) or a mixture thereof are preferred for use on an insulating layer having a high surface energy (> about 30 mN/m), such as Parylene® for example:

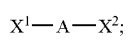—A—;  (I)

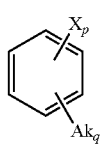  (II)

wherein:
X, $X^1$ and $X^2$ are halogen atoms (mainly fluorine, chlorine and/or bromine);
A is linear or branched ($C_4$-$C_{20}$)alkylene, optionally substituted by halogen atom(s), and optionally comprising one or more, preferably one, double bond, and/or one or more, preferably one, triple bond;
Ak is $C_1$-$C_{10}$ alkyl, preferably $C_1$-$C_6$ alkyl, such as methyl, ethyl, propyl, and linear or branched butyls, pentyls and hexyls;
p and q are each chosen from 1, 2, 3, 4 or 5, provided that p+q is 2, 3, 4, 5 or 6.
Preferably, X, $X^1$ and $X^2$ are independently Cl or Br. Ak preferably represents ethyl.
Examples of formula (I) include the compounds listed in Table 1 above. Examples of formula (II) include the compounds listed in Table 2 above.

Among the wetting agents, those of formula (III) or of formula (IV) or a mixture thereof are appropriate embodiments on an insulating layer having a high surface energy (> about 30 mN/m), such as Parylene® for example:
(III) Siloxane having a ratio of phenyl groups to silicon atom below 1,
(IV) $X^3$-$A_n$,
wherein
$X^3$ is halogen (preferably fluorine, chlorine or bromine) or hydrogen; and
$A_n$ is a linear or branched hydrocarbon or fluorinated hydrocarbon having n carbon atoms, n being equal to or greater than about 2 and equal to or smaller than about 20 and preferably equal to or greater than about 2 and equal to or smaller than about 10.

Compounds of formula (I) and of formula (II) show a good resistance to hydrolysis when in contact with an aqueous conductive fluid, and are particularly suitable wetting agents.

The wetting agent may be a monohalogenated aromatic compound, a α,ω-dihalogenated alkyl compound or a mixture thereof. In a preferred embodiment, the non-conductive fluid comprises 1-bromo-4-ethylbenzene, α,ω-dichloro-octane or a mixture thereof as a wetting agent.

In a preferred embodiment, the non-conductive fluid comprises α,ω-dichloro-octane as hydrolysis-resistant wetting agent.

In another preferred embodiment, the non-conductive fluid comprises 1-bromo-4-ethylbenzene as hydrolysis-resistant wetting agent.

In still another aspect, the invention relates to a multi-phase liquid composition comprising a conductive fluid and a non-conductive fluid, each of said fluids presenting substantially the same density, the non-conductive fluid being immiscible in the conductive fluid and comprising at least one Si- and/or Ge-based compound, and at least one hydrolysis-resistant compound of formula (I) or of formula (II) as herein above described.

In still another aspect, the invention relates to a liquid composition comprising a Si-based compound, a Ge-based compound, a Si—Ge-based compound, or a mixture thereof and at least one hydrolysis-resistant compound chosen from compound of formula (I) and compound of formula (II) as described above, preferably α,ω-dichloro-octane.

The invention features the use of a compound of formula (I), preferably α,ω-dichloro-octane, in an optical electrowetting device, for example an optical lens driven by electrowetting, as hydrolysis-resistant compound.

The invention also features the use of a compound of formula (II), preferably 1-bromo-4-ethylbenzene, in an optical electrowetting device, for example an optical lens driven by electrowetting, as hydrolysis-resistant compound.

One or more of the following features may also be included:
the non-conductive fluid further comprises an anti-oxidant,
the conductive fluid further comprises an anti-oxidant,
the non-conductive fluid further comprises a biocide compound,
the conductive fluid further comprises a biocide compound,
the non-conductive fluid further comprises a UV-filtering agent,
the conductive fluid further comprises a UV-filtering agent.

Anti-oxidant compounds include those known by the one skilled in the art, and, for example, are of the BHT-type (butylated hydroxytoluene) anti-oxidants, such as 2,6-di-tert-butyl-4-methylphenol.

Biocide compounds include those usually known and used in the art, and for example 2-methyl-4-isothiazoline-3-one (MIT) and 1,2-benzisothiozoline-3-one (BIT).

UV-filtering agents are optionally used to prevent the fluid components from any undesirable decomposition when exposed to light, especially sun-light. Such UV-filtering agents are well known in art.

According to another feature, the non-conductive fluid and the conductive fluid have substantially the same density. This means it is acceptable that the difference of densities may vary within a short range. Typically, it is preferred the difference of densities is not more than about $3.10^{-3}$ g/cm$^3$ at 20° C.

According to another feature, the non-conductive fluid and the conductive fluid are transparent (as defined above) and each have a refractive index different from the other.

The difference of refractive index of the two fluids advantageously ranges from about ±0.03 to about ±0.8, preferably from about ±0.04 to about ±0.6, more preferably from about ±0.06 to about ±0.3.

In a preferred embodiment, the refractive index of the non-conductive fluid is greater than the refractive index of the conductive fluid.

In another aspect, the invention relates to an optical electrowetting device, especially to an optical lens driven by electrowetting, comprising a multiphase liquid composition according to the invention.

In still another aspect, the invention relates to the use of at least one Si- and/or Ge-based compound substituted by one or more phenyl groups or of a mixture of Si- and/or Ge-based compounds wherein the at least said one compound is substituted by one or more phenyl groups, in the non-conductive fluid of an optical electrowetting device, for example an optical lens driven by electrowetting.

As described above, it should be understood that, for Si-based compounds of the siloxane type, the invention preferably relates to the use of at least one siloxane, advantageously aryl siloxane, compound substituted by one or more phenyl groups or of a mixture of siloxanes, advantageously aryl siloxanes, wherein the at least said one compound is substituted by one or more aryl, e.g. phenyl, radicals or groups, in the non-conductive fluid of an optical electrowetting device, for example an optical lens driven by electrowetting, and the total number of aryl, e.g. phenyl radical or groups carried by the compound(s) to the total number of Si atoms is equal to or less than about 1.33, preferably than about 1, and more preferably than about 0.8.

This use have been discovered to provide a non-conductive fluid of an optical lens driven by electrowetting, or more generally of an optical electrowetting device, no substantial turbidity upon and after thermal stress, or, when turbidity is present, a relatively rapid recovery of transparency, for example a transparency recovery within less than about 80 hours after a thermal stress of at least about 15 hours, e.g. about 18 hours, at a temperature of about 85° C.

The invention also relates to a method for preparing a non-conductive fluid of an optical lens driven by electrowetting, comprising using a Si- and/or Ge-based compound substituted by one or more phenyl groups or of a mixture of Si- and/or Ge-based compounds wherein at least said one compound is substituted by one or more phenyl groups.

In the present specification, turbidity refers to haze that appears either in the non-conductive fluid or in the conductive fluid or both, upon or after thermal stress.

Turbidity upon or after thermal stress of the fluids is measured using a turbidimeter, as explained in the illustrative examples.

In the present application, description and claims, for either or both the conductive and non-conductive fluids, as well as for all parts of the optical electrowetting device and said optical electrowetting device in its entirety, transparency is to be understood as a transmission of more than about 96% over a wavelength range of from about 400 nm to about 700 nm and/or a scattering energy of less than about 2% in an about 60° (degrees) cone around the direct incidence in the same wavelength range.

Thus in an aspect, the invention features a multi-phase composition comprising a conductive fluid and a non-conductive fluid that is immiscible in the conductive fluid, wherein the non-conductive fluid comprises a Si- and/or Ge-based compound substituted by one or more phenyl groups or a mixture of Si- and/or Ge-based compounds wherein at least one compound is substituted by one or more aryl, e.g. phenyl radicals or groups, wherein, in the case of siloxane, especially aryl siloxane compounds, the ratio of the total number of aryl, e.g. phenyl, radicals or groups carried by the compound(s) to the total number of Si atoms is equal to, or less than, about 1.33, preferably equal to, or less than, about 1, and more preferably equal to, or less than, about 0.8.

In still another aspect, the invention features an optical electrowetting device, typically an optical lens driven by electrowetting, comprising a conductive fluid and a non-conductive fluid that is immiscible in the conductive fluid, wherein the non-conductive fluid comprises a Si- and/or Ge-based compound substituted by one or more phenyl groups or a mixture of Si- and/or Ge-based compounds wherein at least one compound is substituted by one or more phenyl groups. Advantageously, when the non-conductive fluid comprises siloxane(s), especially aryl siloxane(s), the ratio of the total number of aryl, e.g. phenyl, radicals or groups carried by the compound(s) to the total number of Si atoms is advantageously equal to, or less than, about 1.33, preferably equal to, or less than, about 1, and more preferably equal to, or less than, about 0.8, in the case of siloxane and/or aryl siloxane compounds.

In still another aspect, the invention relates to a multi-phase liquid composition comprising a conductive fluid and a non-conductive fluid, each of said fluids presenting substantially the same density, the non-conductive fluid being immiscible in the conductive fluid and comprising at least one Si— and/or Ge-based compound, and at least one hydrolysis-resistant compound chosen from compound of formula (I) and compound of formula (II) as herein before described.

In a preferred embodiment, the non-conductive fluid comprises α,ω-dichloro-octane as an hydrolysis-resistant compound.

In another preferred embodiment, the non-conductive fluid comprises 1-bromo-4-ethylbenzene as an hydrolysis-resistant compound.

In still another aspect, the invention relates to a liquid composition comprising a Si-based compound, a Ge-based compound, a Si—Ge-based compound, or a mixture thereof and at least one hydrolysis-resistant compound chosen from compound of formula (I) and compound of formula (II) as described above, preferably 1-bromo-4-ethylbenzene or α,ω-dichloro-octane.

The invention features the use of a compound of formula (I), preferably α,ω-dichloro-octane, in an optical electrowetting device, typically an optical lens driven by electrowetting, as hydrolysis-resistant compound.

The invention also features the use of a compound of formula (II), preferably 1-bromo-4-ethylbenzene, in an optical electrowetting device, typically an optical lens driven by electrowetting, as hydrolysis-resistant compound.

In another aspect, the invention relates to an optical electrowetting device, typically an optical lens driven by electrowetting, according to the invention. In a feature, the device or lens comprises means to apply a D.C. voltage or an A.C. voltage, preferably an A.C. voltage to the conductive fluid.

This device or lens may be used or be part of a variable focus liquid lens, an optical diaphragm, an optical zoom, an ophthalmic device, an electrowetting aperture and any other optical device using electrowetting.

In still another aspect, the invention is related to a set or to an apparatus comprising an optical electrowetting device, typically an optical lens driven by electrowetting, according to the invention, and a driver or similar electronic means for controlling the device or lens. In an embodiment, an optical electrowetting device, typically an optical lens driven by electrowetting, and the driver or similar electronic means, are integrated in the apparatus. In another embodiment, the apparatus comprises several (more than one) optical electrowetting devices, typically several optical lenses driven by electrowetting, and at least one driver or similar electronic means. According to a feature, the apparatus comprises means to apply a D.C. voltage or an A.C. voltage, preferably an A.C. voltage to the conductive fluid. The apparatus may be a camera, a cell phone, an endoscope, a telemeter, a dental video, and the like.

The present invention is now described in further details by way of non-limiting examples and by reference to the attached drawings.

Figure 1:
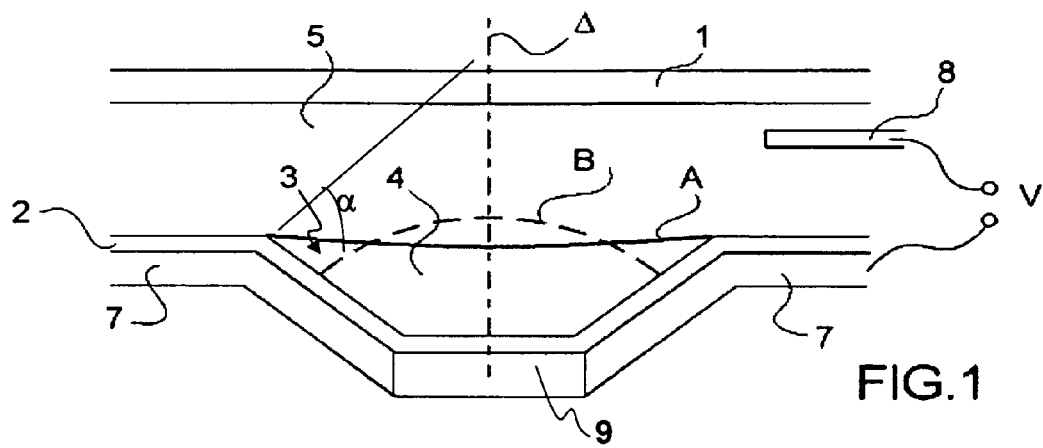
FIG. 1 is a simplified cross-section view of a variable-focus liquid lens according to the invention.

The invention is further described with the following examples which are presented as illustration of some specific embodiments and which are not intended to limit the scope of the invention, the scope of which is clearly defined in the appended claims.

EXAMPLES

Examples of Various Species for Use as, or Comprised in, a Conductive Fluid

|  | Density at 25° C. | Surface tension (mN/m) | viscosity at 25° C. (mPa s) | Refractive index | Boiling point (° C.) |
|---|---|---|---|---|---|
| ethanol | 0.789 | 21.97 | 1.1 | 1.36 | 78 |
| ethylene glycol | 1.113 | 47.99 | 16.1 | 1.431 | 196-198 |
| 1,2-propanediol | 1.036 | 36.66 | 40.4 | 1.432 | 187 |
| glycerol | 1.262 | 63.3 | 934 | 1.472 | 182/20 mm Hg |
| CF1[1)] | 1.0869 | 43.5 | 15.6 | 1.4115 |  |
| Water | 1 | 72.88 | 1 | 1.33 | 100 |

[1)]CF1 is a conductive fluid containing: 33.77 wt % water, 0.2 wt % sodium sulfate, 43.8 wt % 1,2-propane diol, 22.2 wt % 1,2,3-propane triol, and 0.03 wt % of the biocide Acticide ® RS (available at Thor GmbH).

Examples of Various Main Components of the Non Conductive Fluid

The following hydrocarbon compounds may be used in the non-conductive fluid: decane ($C_{10}H_{22}$), dodecane ($C_{12}H_{24}$), squalane ($C_{30}H_{62}$); tert-butylcyclohexane ($C_{10}H_{20}$), α-chloronaphthalene, α-bromonaphthalene, cis,trans-decahydronaphthalene ($C_{10}H_{18}$), Isopar® V (Exxon Mobil), Isopar® P (Exxon Mobil), The following Si-based compounds may be used in the non-conductive fluid:

| Si- and or Ge-based compound | Ratio Ph/Si | Ratio Ph/Me |
|---|---|---|
| SIP 6827.0 ® (ABCR GmbH, Phenyltris(trimethylsiloxy)silane) | 0.25 | 0.11 |
| PMM-011 (750-FTF-EX ®, 3M; Poly(phenylmethylsiloxane) | | |
| SID 4556 (ABCR GmbH, 3,5-Diphenyloctamethyltetrasiloxane) | 0.5 | 0.25 |
| SIT 8662 (ABCR GmbH, 3,5,7-Triphenylnonamethylpentasiloxane) | 0.6 | 0.33 |
| DC 705 ® (Dow Corning, Trimethyl pentaphenyl trisiloxane) | 1.66 | 1.66 |
| PDM 7040 ® (Gelest, 1,1,5,5-Tetraphenyl-1,3,3,5-tetramethyl trisiloxane) | 1.33 | 1 |
| PSDF 04 ® (1,1,5,5-tetraphenyl-1,3,3,5-tetramethyltrisiloxane) | 1.33 | 1 |
| DC 704 ® (Dow Corning, Tetramethyl tetraphenyl trisiloxane) | 1.33 | 1 |
| SIP 6719.5 ® (ABCR GmbH, 1,1,3,5,5-Pentaphenyl-1,3,5-trimethyl siloxane) | 1.66 | 1.66 |
| DC 702 ® (mixture of cyclosiloxane and phenylated siloxanes, Dow Corning) | >1.33 | >1.33 |
| Hexamethyldigermane | 0 | 0 |

Examples of Multi-Phase Liquid Compositions According to the Invention

All % are by weight. All characteristics are measured at 20° C.

Composition 1:

| Non-conductive fluid | | Conductive fluid | |
|---|---|---|---|
| Compound | Amount | Compound | Amount |
| SIP 6728.0 | 20% | water | 54.65% |
| DC 702 | 54.4% | $Na_2SO_4$ | 0.2% |
| 1,8-dichlorooctane | 25% | MPG | 45% |
| BHT | 0.6% | Acticide ® MBS | 0.15% | d (g/cm³): 1.0386    d (g/cm³): 1.0369
n: 1.4860    n: 1.3840
viscosity (cSt): 9.6    viscosity (cSt): 5.3
Δd (g/cm³): 0.0017
Δn: 0.102
Average viscosity (cSt): 7.5

Composition 2:

| Non-conductive fluid | | Conductive fluid | |
|---|---|---|---|
| Compound | Amount | Compound | Amount |
| SIP 6827.0 | 20% | water | 39.65% |
| DC702 | 59.4% | $Na_2SO_4$ | 0.2% |
| 1,8-dichlorooctane | 20% | MPG | 60% |
| BHT | 0.6% | Acticide ® MBS | 0.15% | d (g/cm³): 1.0416    d (g/cm³): 1.0439
n: 1.0489    n: 1.3995
viscosity (cSt): 11.5    viscosity (cSt): 9.1
Δd (g/cm³): 0.0023
Δn: 0.0895
Average viscosity (cSt): 10.3

Composition 3:

| Non-conductive fluid | | Conductive fluid | |
|---|---|---|---|
| Compound | Amount | Compound | Amount |
| SIP 6827.0 | 20% | water | 40% |
| DC702 | 60% | $Na_2SO_4$ | 0.2% |
| 1,8-dichlorooctane | 20% | MPG | 60% | d (g/cm³): 1.0423    d (g/cm³): 1.0434
n: 1.4875    n: 1.3995
viscosity (cSt): 11.3    viscosity (cSt): 9.2
Δd (g/cm³): 0.0011
Δn: 0.088
Average viscosity (cSt): 10.3

Composition 4:

| Non-conductive fluid | | Conductive fluid | |
|---|---|---|---|
| Compound | Amount | Compound | Amount |
| SIP 6827.0 | 16.4% | LiBr | 1.5% |
| DC702 | 58% | water | 53.35% |
| 1,8-dichlorooctane | 25% | MPG | 45% |
| BHT | 0.6% | Acticide ® MBS | 0.15% | d (g/cm³): 1.0448    d (g/cm³): 1.0464
n: 1.4905    n: 1.3870
viscosity (cSt): 10.4    viscosity (cSt): 5.4
Δd (g/cm³): 0.0016
Δn: 0.1035
Average viscosity (cSt): 7.9

Composition 5:

| Non-conductive fluid | | Conductive fluid | |
|---|---|---|---|
| Compound | Amount | Compound | Amount |
| Isopar ® V | 49.3% | AcOK 20% | 75% |
| o-bromoethylbenzene | 50.7% | Ethanol | 25% | d (g/cm³): 1.0224    d (g/cm³): 1.0270
n: 1.4880    n: 1.3671
viscosity (cSt): 4.1    viscosity (cSt): 2.8
Δd (g/cm³): 0.0046
Δn: 0.1208
Average viscosity (cSt): 3.5

Composition 6:

| Non-conductive fluid | | Conductive fluid | |
|---|---|---|---|
| Compound | Amount | Compound | Amount |
| Isopar ® V | 19% | Water | 53.85% |
| Chlorooctane | 19.4% | LiBr | 6% |

-continued

| Non-conductive fluid | | Conductive fluid | |
|---|---|---|---|
| p-bromoethylbenzene | 61% | Ethylene Glycol | 20% |
| BHT | 0.6% | MPG | 20% |
| | | Acticide ® MBS | 0.15% |
| d (g/cm$^3$): 1.0893 | | d (g/cm$^3$): 1.0889 | |
| n: 1.4915 | | n: 1.3870 | |
| viscosity (cSt): 1.6 | | viscosity (cSt): 4.0 | |
| Δd (g/cm$^3$): 0.0004 | | | |
| Δn: 0.1045 | | | |
| Average viscosity (cSt): 2.8 | | | |

Composition 7:

| Non-conductive fluid | | Conductive fluid | |
|---|---|---|---|
| Compound | Amount | Compound | Amount |
| Isopar ® V | 35.2% | Water | 53.865% |
| p-bromoethylbenzene | 64.2% | LiBr | 5.985% |
| BHT | 0.6% | Ethylene Glycol | 20% |
| | | MPG | 20% |
| | | Acticide ® MBS | 0.15% |
| d (g/cm$^3$): 1.0890 | | d (g/cm$^3$): 1.0889 | |
| n: 1.5010 | | n: 1.3870 | |
| viscosity (cSt): 2.3 | | viscosity (cSt): 4.0 | |
| Δd (g/cm$^3$): 0.0001 | | | |
| Δn: 0.1140 | | | |
| Average viscosity (cSt): 3.2 | | | |

Composition 8:

| Non-conductive fluid | | Conductive fluid | |
|---|---|---|---|
| Compound | Amount | Compound | Amount |
| DC702 | 65% | Water | 47% |
| 1,8-dichlorooctane | 35% | Na$_2$SO$_4$ | 0.2% |
| | | EG | 53% |
| d (g/cm$^3$): 1.0696 | | d (g/cm$^3$): 1.0704 | |
| n: 1.4965 | | n: 1.3865 | |
| viscosity (cSt): 11.5 | | viscosity (cSt): 3.9 | |
| Δd (g/cm$^3$): 0.0008 | | | |
| Δn: 0.110 | | | |
| Average viscosity (cSt): 7.7 | | | |

Composition 9:

| Non-conductive fluid | | Conductive fluid | |
|---|---|---|---|
| Compound | Amount | Compound | Amount |
| SIP 6827.0 | 20% | Water | 40% |
| DC702 | 60% | Na$_2$SO$_4$ | 0.2% |
| 1,8-dichlorooctane | 20% | MPG | 60% |
| d (g/cm$^3$): 1.0488 | | d (g/cm$^3$): 1.0438 | |
| n: 1.4880 | | n: 1.399 | |
| viscosity (cSt): 11.4 | | viscosity (cSt): 9.2 | |
| Δd (g/cm$^3$): 0.0013 | | | |
| Δn: 0.0881 | | | |
| Average viscosity (cSt): 10.3 | | | |

Composition 10:

| Non-conductive fluid | | Conductive fluid | |
|---|---|---|---|
| Compound | Amount | Compound | Amount |
| p-bromopropylbenzene | 68% | Water | 49.2 |
| Isopar ® V | 32% | AcOK | 10.8% |
| | | MPG | 40% |
| d (g/cm$^3$): 1.0846 | | d (g/cm$^3$): 1.0844 | |
| n: 1.50 | | n: 1.3915 | |
| viscosity (cSt): 2.8 | | viscosity (cSt): 6.2 | |
| Δd (g/cm$^3$): 0.0002 | | | |
| Δn: 0.1085 | | | |
| Average viscosity (cSt): 4.3 | | | |

Composition 11:

| Non-conductive fluid | | Conductive fluid | |
|---|---|---|---|
| Compound | Amount | Compound | Amount |
| Hexamethyldigermane | 35% | water | 46.8% |
| Isopar ® V | 15% | AcOK | 2.88% |
| 1.8 dichlorooctane | 50% | EG | 37% |
| | | Ethanol | 15% |
| d (g/cm$^3$): 1.0331 | | d (g/cm$^3$): 1.0329 | |
| n: 1.4595 | | n: 1.3820 | |
| viscosity (cSt): 2.4 | | viscosity (cSt): 4.2 | |
| Δd (g/cm$^3$): 0.0002 | | | |
| Δn: 0.0775 | | | |
| Average viscosity (cSt): 3.3 | | | |

Composition 12:

| Non-conductive fluid | | Conductive fluid | |
|---|---|---|---|
| Compound | Amount | Compound | Amount |
| SID 4556 | 40% | water | 48% |
| 1-bromononane | 60% | AcOK20% | 2% |
| | | MPG | 50% |
| d (g/cm$^3$): 1.0411 | | d (g/cm$^3$): 1.0399 | |
| n: 1.4640 | | n: 1.3985 | |
| viscosity (cSt): 2.7 | | viscosity (cSt): 6.4 | |
| Δd (g/cm$^3$): 0.0012 | | | |
| Δn: 0.0655 | | | |
| Average viscosity (cSt): 4.6 | | | |

Composition 13:

| Non-conductive fluid | | Conductive fluid | |
|---|---|---|---|
| Compound | Amount | Compound | Amount |
| PMM-011 | 70% | water | 46.8% |
| o-bromoethylbenzene | 30% | AcOK20% | 1.2% |
| | | EG | 52% |
| d (g/cm$^3$): 1.0691 | | d (g/cm$^3$): 1.0686 | |
| n: 1.4970 | | n: 1.3857 | |
| viscosity (cSt): 3.7 | | viscosity (cSt): 3.8 | |
| Δd (g/cm$^3$): 5 10$^{-4}$ | | | |
| Δn: 0.111 | | | |
| Average viscosity (cSt): 3.7 | | | |

Composition 14:

| Non-conductive fluid | | Conductive fluid | |
|---|---|---|---|
| Compound | Amount | Compound | Amount |
| SID 4556 | 100% | water | 55% |
|  |  | AcOK20% | 20% |
|  |  | Ethanol | 25% |
| d (g/cm³): 0.979 | | d (g/cm³): 0.9803 | |
| n: 1.4774 | | n: 1.3515 | |
| viscosity (cSt): 6.7 | | viscosity (cSt): 2.4 | |
| Δd (g/cm³): 1.3 10⁻³ | | | |
| Δn: 0.1260 | | | |
| Average viscosity (cSt): 4.7 | | | |

Composition 15:

| Non-conductive fluid | | Conductive fluid | |
|---|---|---|---|
| Compound | Amount | Compound | Amount |
| DC 702 | 59% | water | 47% |
| 1-bromodecane | 41% | Na₂SO₄ | 0.2% |
|  |  | Ethylene Glycol | 53% |
| d (g/cm³): 1.0687 | | d (g/cm³): 1.0688 | |
| n: 1.4935 | | n: 1.3863 | |
| viscosity (cSt): 11.5 | | viscosity (cSt): 3.9 | |
| Δd (g/cm³): 10⁻⁴ | | | |
| Δn: 0.1072 | | | |
| Average viscosity (cSt): 7.7 | | | |

Composition 16:

| Non-conductive fluid | | Conductive fluid | |
|---|---|---|---|
| Compound | Amount | Compound | Amount |
| SIP 6827.0 | 18% | water | 39.8% |
| DC702 | 52% | Na₂SO₄ | 0.2% |
| 1-bromododecane | 30% | MPG | 60% |
| d (g/cm³): 1.0459 | | d (g/cm³): 1.0424 | |
| n 1.4861 | | n: 1.399 | |
| viscosity (cSt): 9.3 | | viscosity (cSt): 9.0 | |
| Δd (g/cm³): 0.0035 | | | |
| Δn: 0.0871 | | | |
| Average viscosity (cSt): 9.2 | | | |

Composition 17:

| Non-conductive fluid | | Conductive fluid | |
|---|---|---|---|
| Compound | Amount | Compound | Amount |
| PMM-011 | 43% | water | 48% |
| 1-bromononane | 57% | AcOK20% | 2% |
|  |  | MPG | 50% |
| d (g/cm³): 1.0395 | | d (g/cm³): 1.0399 | |
| n: 1.4662 | | n 1.3985 | |
| viscosity (cSt): 2.9 | | viscosity (cSt): 6.6 | |
| Δd (g/cm³): 4 10⁻⁴ | | | |
| Δn: 0.0769 | | | |
| Average viscosity (cSt): 4.8 | | | |

Composition 18:

| Non-conductive fluid | | Conductive fluid | |
|---|---|---|---|
| Compound | Amount | Compound | Amount |
| DC 702 | 54% | water | 25% |
| 1,8-dichlorooctane | 46% | AcOK20% | 25% |
|  |  | MPG | 50% |
| d (g/cm³): 1.0622 | | d (g/cm³): 1.0616 | |
| n: 1.4895 | | n: 1.3953 | |
| viscosity (cSt): 8.3 | | viscosity (cSt): 7.5 | |
| Δd (g/cm³): 6 10⁻⁴ | | | |
| Δn: 0.0942 | | | |
| Average viscosity (cSt): 7.9 | | | |

Composition 19:

| Non-conductive fluid | | Conductive fluid | |
|---|---|---|---|
| Compound | Amount | Compound | Amount |
| SIP 6827 | 27.7% | NaBr | 0.50% |
| DC 702 | 40% | water | 48.5 |
| Phenyltrimethylgermane | 32.3% | EG | 12% |
|  |  | TMG | 38% |
|  |  | Pentanol | 1% |
| d (g/cm³): 1.0434 | | d (g/cm³): 1.0447 | |
| n: 1.489 | | n: 1.38895 | |
| viscosity (cSt): 4.5 | | viscosity (cSt): 5.1 | |
| Δd (g/cm³): 0.0013 | | | |
| Δn: 0.10005 | | | |
| Average viscosity (cSt): 4.8 | | | |

Composition 20:

| Non-conductive fluid | | Conductive fluid | |
|---|---|---|---|
| Compound | Amount | Compound | Amount |
| SIP 6823 (silane) | 21% | NaBr | 0.50% |
| DC 702 | 40% | water | 48.5 |
| Phenyltrimethylgermane | 39% | EG | 12% |
|  |  | TMG | 38% |
|  |  | Pentanol | 1% |
| d (g/cm3): 1.0411 | | d (g/cm3): 1.0447 | |
| n: 1.50747 | | n: 1.38895 | |
| viscosity (cSt): 3.0 | | viscosity (cSt): 5.1 | |
| Δd (g/cm3): 0.0036 | | | |
| Δn: 0.11852 | | | |
| Average viscosity (cSt): 4.1 | | | |

Composition 21:

| Non-conductive fluid | | Conductive fluid | |
|---|---|---|---|
| Compound | Amount | Compound | Amount |
| SIP 6827.0 | 23.00% | NaBr | 0.50% |
| Phenyltrimethylgermane | 77.00% | water | 49.50% |
|  |  | EG | 39.00% |
|  |  | MPG | 10.00% |
|  |  | Pentanol | 1.00% |
| d (g/cm³): 1.0578 | | d (g/cm³): 1.0602 | |
| n: 1.48735 | | n: 1.38564 | |
| viscosity (cSt): 1.3 | | viscosity (cSt): 4.1 | |

-continued

Δd (g/cm³): 0.0024
Δn: 0.10171
Average viscosity (cSt): 2.7

Composition 22:

| Non-conductive fluid | | Conductive fluid | |
|---|---|---|---|
| Compound | Amount | Compound | Amount |
| Phenyltrimethylgermane | 66.00% | NaBr | 0.50% |
| DMS T15 | 14.00% | water | 48.5 |
| SIP 6827.0 | 20.00% | EG | 12% |
| | | TMG | 38% |
| | | Pentanol | 1% | d (g/cm³): 1.0467
n: 1.47536
viscosity (cSt): 2.5 d (g/cm³): 1.0447
n: 1.38895
viscosity (cSt): 5.1

Δd (g/cm³): 0.002
Δn: 0.08641
Average viscosity (cSt): 3.8

Composition 23:

| Non-conductive fluid | | Conductive fluid | |
|---|---|---|---|
| Compound | Amount | Compound | Amount |
| SIP 6827.0 | 23.00% | NaBr | 0.50% |
| Phenyltrimethylgermane | 77.00% | Water | 49.50% |
| | | EG | 39.00% |
| | | MPG | 10.00% |
| | | Pentanol | 1.00% | d (g/cm3): 1.0578
n: 1.48735
viscosity (cSt): 1.3 d (g/cm3): 1.0602
n: 1.38564
viscosity (cSt): 4.0

Δd (g/cm3): 0.0024
Δn: 0.10171
Average viscosity (cSt): 2.7

Composition 24:

| Non-conductive fluid | | Conductive fluid | |
|---|---|---|---|
| Compound | Amount | Compound | Amount |
| Phenyltrimethylgermane | 66.00% | NaBr | 0.50% |
| DMS T15 | 14.00% | Water | 48.5 |
| SIP 6827.0 | 20.00% | EG | 12% |
| | | TMG | 38% |
| | | Pentanol | 1% | d (g/cm3): 1.0467
n: 1.47536
viscosity (cSt): 2.5 d (g/cm3): 1.0447
n: 1.38895
viscosity (cSt): 5.1

Δd (g/cm3): 0.002
Δn: 0.08641
Average viscosity (cSt): 3.8

Composition 25:

| Non-conductive fluid | | Conductive fluid | |
|---|---|---|---|
| Compound | Amount | Compound | Amount |
| DC 200/10 | 10.00% | NaBr | 5.00% |
| Phenyltrimethylgermane | 90.00% | water | 47.00% |
| | | EG | 47.00% |
| | | Pentanol | 1.00% | d (g/cm3): 1.09805
n: 1.4942
viscosity (cSt): 1.3 d (g/cm3): 1.1016
n: 1.3908
viscosity (cSt): 3.8

Δd (g/cm3): 0.0031
Δn: 0.1034
Average viscosity (cSt): 2.5

Composition 26:

| Non-conductive fluid | | Conductive fluid | |
|---|---|---|---|
| Compound | Amount | Compound | Amount |
| DMS-T02 | 34.00% | NaBr | 2.50% |
| diphényldiméthylgermane | 66.00% | water | 51.00% |
| | | EG | 45.30% |
| | | Pentanol | 1.00% |
| | | 1-Hexanol | 0.20% | d (g/cm3): 1.0792
n: 1.5113
viscosity (cSt): 3.8 d (g/cm3): 1.0774
n: 1.3822
viscosity (cSt): 3.6

Δd (g/cm3): 0.0019
Δn: 0.1291
Average viscosity (cSt): 3.7

Composition 27:

| Non-conductive fluid | | Conductive fluid | |
|---|---|---|---|
| Compound | Amount | Compound | Amount |
| Diphényldiméthylgermane | 76.00% | NaBr | 2.50% |
| Isopar P | 24.00% | water | 48.50% |
| | | EG | 48.00% |
| | | Pentanol | 1% | d (g/cm3): 1.0833
n: 1.5405
viscosity (cSt): 4.1 d (g/cm3): 1.0811
n: 1.3846
viscosity (cSt): 3.9

Δd (g/cm3): 0.0022
Δn: 0.1559
Average viscosity (cSt): 4.0

Hydrolysis Assay

The following table describes the percentage of hydrolysis of various halogenated compounds. Chlorinated alkyls are more resistant towards hydrolysis as compared to the corresponding brominated alkyls (1,8-dibromo-octane/1,8-dichloro-octane and 1,9-dibromononane/1,9-dichlorononane for instance). Aromatic systems are usually more stable than halogenated alkyls.

|  | % hydrolyzed halogen |
| --- | --- |
| 1,2-dibromohexane | 1.3886 |
| 1,6-dibromohexane | 5.3936 |
| 1-bromooctane | 0.5259 |
| 1,8-dibromooctane | 0.8503 |
| 1,9-dibromononane | 0.4875 |
| 1-bromononane | 0.2293 |
| 1-bromododecane | 0.0079 |
| 2-bromododecane | 0.0729 |
| 1-bromonaphtalene | 0.0014 |
| 2-bromothioanisol | 0.0331 |
| 1-chloro octane | 0.112 |
| 1,8-dichlorooctane | 0.218 |
| 1,9-dichlorononane | 0.136 |
| 1-fluorooctane | 0.088 |

Two non-miscible fluids are prepared as described below, the non conductive fluid containing one of the halogenated compounds. A vial is filled with both fluids and heated up at 85° C. during 96 hours. Fluids cooled down to room temperature and are separated. Bromine ions concentration is measured in the conductive fluid by gas chromatography. The lowest bromide concentration corresponds to the more hydrolysis resistant compound.

| Compound | Weight % |
| --- | --- |
| *Conductive fluid* | |
| Water | 33.77% |
| $Na_2SO_4$ | 0.2% |
| 1,2-Propane diol | 43.8% |
| 1,2,3-Propane triol | 22.2% |
| Acticid molecule (RS from Thor) | 0.03% |
| *Non-conductive fluid* | weight % |
| SIP 6827.0 | 35% |
| DC 704 | 25.1% |
| DC 702 | 15% |
| DC 705 | 5% |
| Halogenated compound | 19.9% |

Turbidity Assay

1) Effects on the Nature of the Salts on Turbidity

Turbidity is measured using a HACH® 2100p turbidimeter, on 10 mL of fluid.

A multi-phase composition (conductive fluid+non-conductive fluid) is warmed at 85° C. for 18 hours (thermal stress). The multi-phase composition is allowed to cool to room temperature (2 hours) after the thermal stress. Each of the fluid is then assayed at various period of time for turbidity.

Figure 2:
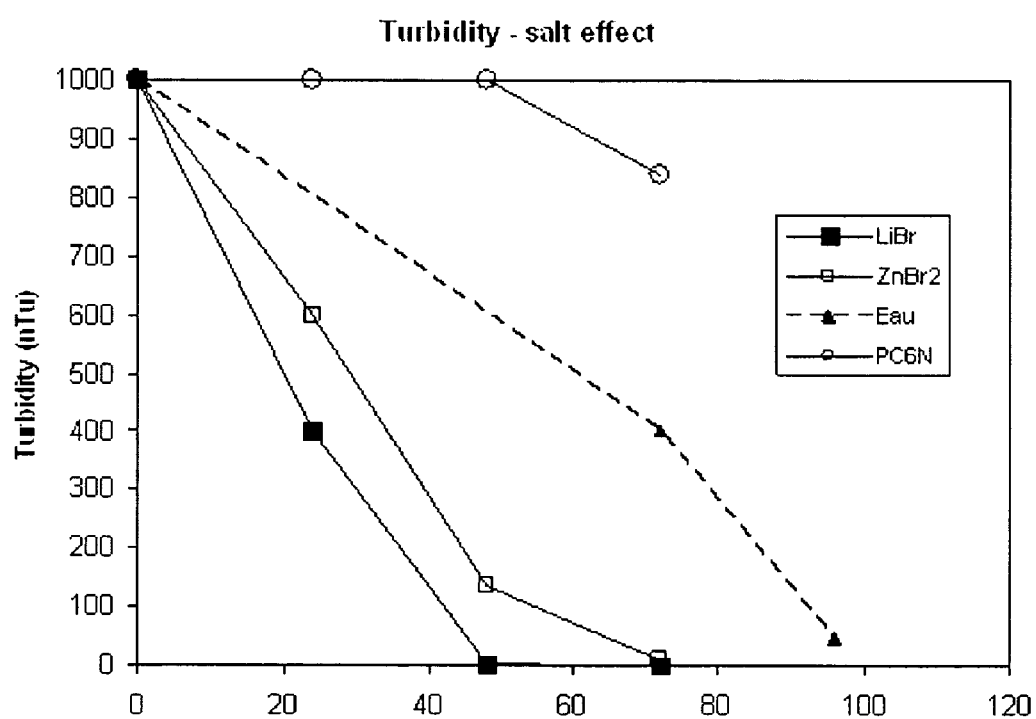
FIG. 2 is an illustration of the turbidity and transparency recovery of the non-conductive fluid, depending on the nature of the conductive fluid.

As an example, FIG. 2 illustrates the effect of the nature of salt used in the conductive fluid on the turbidity of the non-conductive fluid:

Four multi-phase compositions of DC 704® and
1) CF1, a conductive fluid as defined above,
2) Water alone,
3) solution of LiBr in water, (d=1.09, 13% in weight)
4) solution of $ZnBr_2$ in water, (d=1.09, 9.9% in weight)

are submitted to a thermal stress as described above.

Turbidity of DC 704® is assayed for each multi-phase composition at various periods of time, up to 100 hours after thermal stress.

2) Effects on the Nature of Phenylated Si-Based Compounds on Turbidity

A turbidity assay is realized as described above, using water alone as the conductive fluid and various phenylated Si-based compounds as the non-conductive fluid. Results are presented in the below table.

|  | DC705 | PDM7040 | SIP 6728.0 | DC704 |
| --- | --- | --- | --- | --- |
| [Phenyl to (Si + Ge)] ratio | 1.66 | 1.33 | 0.25 | 1.33 |
| Turbidity | >1000 NTU | 55 NTU | 0.32 NTU | 137 NTU |

The invention claimed is:

1. A method of making an optical electrowetting device, comprising:
incorporating, into an electrowetting structure, a non-conductive fluid comprising a mono germane compound substituted by one or more aryl groups.

2. The method of claim 1, wherein the mono germane compound is diphenyldimethylgermane or phenyltrimethylgermane.

3. The method of claim 1, wherein the optical electrowetting device is an optical lens driven by electrowetting.

4. A method of making an optical electrowetting device, comprising:
incorporating, into an electrowetting structure, a non-conductive fluid comprising one selected from a group consisting of a compound of formula (I), a compound of formula (II), and a mixture thereof, as hydrolysis-resistant compound:

(I)

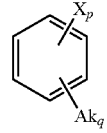

(II)

wherein:
X, X' and $X^2$ are halogen atoms;
A is linear or branched $(C_4$-$C_{20})$alkylene, optionally substituted by halogen atom(s), and optionally comprising one or more double bond, or one or more triple bond;
Ak is $C_1$-$C_{10}$ alkyl, preferably $C_1$-$C_6$ alkyl; and
p and q are each chosen from 1, 2, 3, 4 or 5, provided that p+q is 2, 3, 4, 5 or 6.

5. The method of claim 4, wherein the hydrolysis-resistant compound is 1-bromo-4-ethylbenzene or α,ω-dichloro-octane.

6. The method of claim 4, wherein the optical electrowetting device is an optical lens driven by electrowetting.

7. A method of making an optical electrowetting device, comprising:
incorporating into an electrowetting structure a non-conductive fluid comprising at least one compound of formula (III)

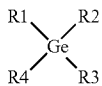

wherein:
R1, R2, R3, R4 are independently one of alkyl, (hetero)alkyl, (hetero)arylalkyl, (hetero)arylalkenyl, (hetero)arylalkyl, or cycloalkyl.

8. The method of claim 7, wherein the optical electrowetting device is an optical lens driven by electrowetting.

9. The method of claim 7, wherein the at least one compound of formula (III) is diphenyldimethylgermane or phenyltrimethylgermane.

10. The method of claim 7, wherein the at least one compound of formula (III) is used as a wetting agent.

11. The method of claim 7, wherein the at least one compound of formula (III) is used as a hydrolysis-resistant compound.

12. The method of claim 7, wherein the at least one compound of formula (III) is used as a viscosity-lowering agent.

13. The method of claim 7, wherein the at least one compound of formula (III) is used as a density adjusting agent compound.

14. An optical electrowetting device comprising a conductive fluid and a non-conductive fluid that is immiscible in the conductive fluid, wherein the non conductive fluid comprises at least one compound of formula (III)

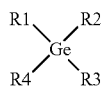

wherein:
R1, R2, R3, R4 are independently one of alkyl, (hetero)alkyl, (hetero)arylalkyl, (hetero)arylalkenyl, (hetero)arylalkyl, or cycloalkyl.

* * * * *